United States Patent [19]

Eberhardt

[11] Patent Number: 4,747,958

[45] Date of Patent: May 31, 1988

[54] METHOD AND APPARATUS FOR TREATING BODIES OF WATER

[76] Inventor: Thomas E. Eberhardt, 220 Blenheim Dr., Easton, Pa. 18042

[21] Appl. No.: 75,114

[22] Filed: Jul. 20, 1987

[51] Int. Cl.⁴ .............................................. C02F 1/68
[52] U.S. Cl. ................................. 210/749; 210/198.1; 210/242.1
[58] Field of Search ............... 210/749, 752, 753–763, 210/241, 242.1, 198.1, 918, DIG. 1, 747; 114/61; 429/2, 47

[56] References Cited

U.S. PATENT DOCUMENTS

| | | | |
|---|---|---|---|
| 3,942,457 | 3/1976 | Keyes et al. | 114/61 |
| 4,072,798 | 2/1978 | Sisler et al. | 429/2 |
| 4,208,283 | 6/1980 | Brouzes | 210/754 |
| 4,347,133 | 8/1982 | Brigante | 210/752 |
| 4,507,206 | 3/1985 | Hughes | 210/709 |
| 4,518,506 | 5/1985 | Green et al. | 210/747 |
| 4,530,765 | 7/1985 | Sabherwal | 210/747 |
| 4,551,244 | 11/1985 | Inove | 210/198.1 |

OTHER PUBLICATIONS

Patent Search Results (Key word computer search).
Living Lakes (House brochure of Living Lakes, Inc.).
Living Lakes News—Living Lakes Membership News Letter, vol. 1, No. 1—Jul. 11, 1986.
Living Lakes News—Living Lakes Membership Newsletter, vol. 1, No. 2, Sep. 15, 1986.
MPMs Limestone Fights Effectives of Acid Rain in Troubled Waters, pp. 6–9 "Pfizer Scene", Nov. 1986.

*Primary Examiner*—Frank Sever
*Attorney, Agent, or Firm*—Charles A. Wilkinson

[57] ABSTRACT

A method of chemically treating bodies of water such as lakes by accurately dispensing a treatment agent into the water in an amount based upon the volume of water being passed over continuously determined by detection means for the speed of the boat carrying the dispensing means for the speed of the boat carrying the dispensing means and the depth of the water being passed over. When the water is being neutralized by the chemical addition, the pH of the water may also be continuously monitored. A boat particularly designed and adapted for practicing the method is also disclosed. The boat includes a main tank partially supported or floated by the water at least when the tank is loaded and also stabilized and partially or additionally supported by lateral pontoons when loaded. The boat includes sparging, or mixing, and spraying means to dispense the treatment agent.

22 Claims, 7 Drawing Sheets

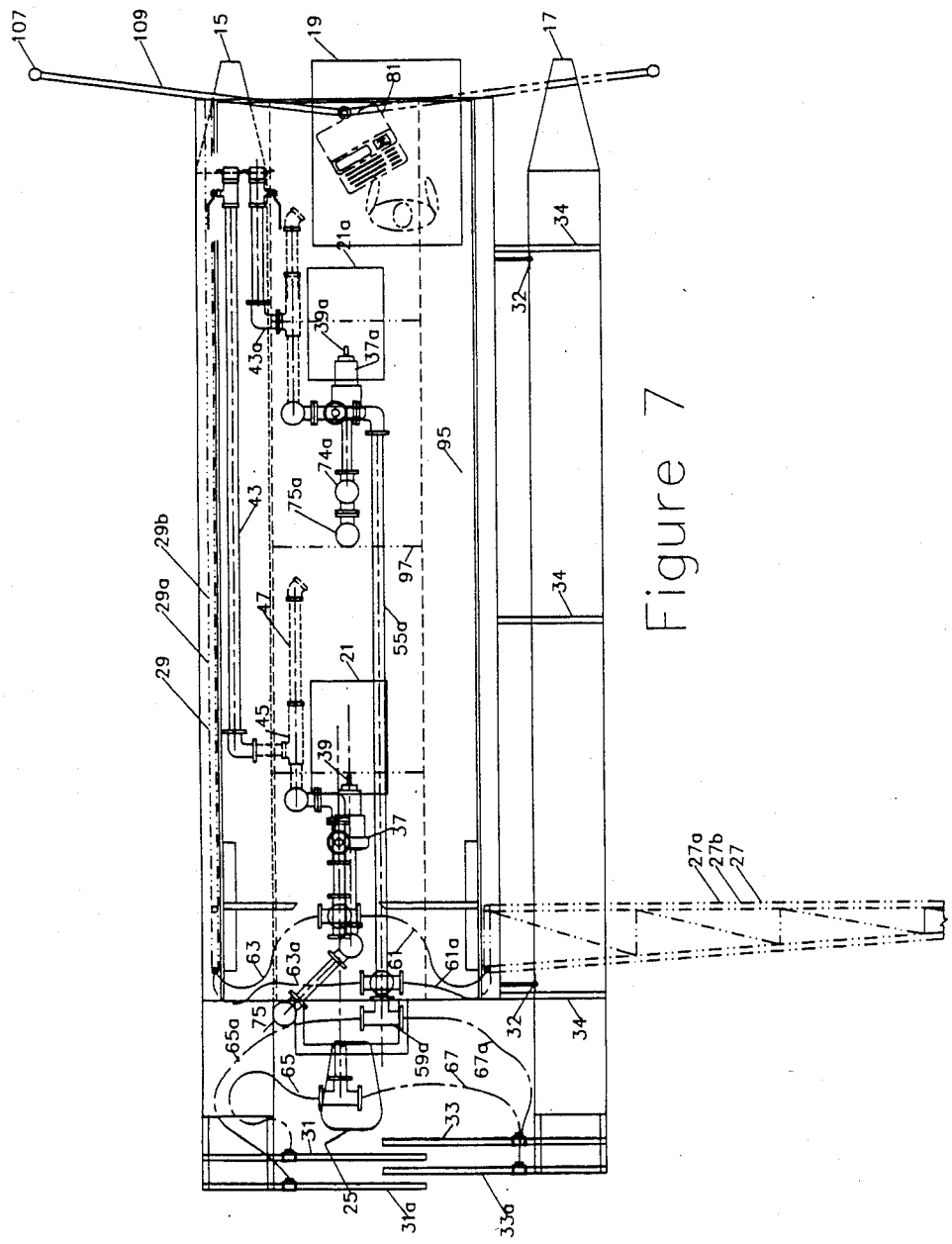

METHOD AND APPARATUS FOR TREATING BODIES OF WATER

BACKGROUND OF THE INVENTION (1) Field of the Invention

This invention relates to the treatment of bodies of water such as lakes with various treatment agents to improve the quality of the water. More particularly, the invention relates to the accurate application of chemical and other agents to bodies of water by the use of floating platforms such as boats and the like. More particularly still, the invention provides an apparatus and method for applying the treatment agent on a uniform and effective basis designed to overcome or mitigate undesirable chemical conditions or balances in bodies of water. The invention involves concurrent detection of parameters by which the volume of water to be treated is determined and application of the treatment agent is controlled.

(2) Description of the Prior Art

In recent years, problems of lake acidification resulting largely from so-called "acid rain" have become increasingly serious. While such acidification problems are not new and a variety of techniques have been employed in the past to counteract the adverse effects of excess concentrations of acid in lakes and other bodies of water, the problem in recent years has become particularly acute in the industrialized nations. This is due in large part, it is believed, to the increasing use of combustion processes, and particularly those combustion processes which use high sulfur fuel. Coal and oil, which are ultimately derived from biological residues, frequently contain fairly high levels of sulfur derived not only from the original biological material, but in addition to sulfur brought in from various sources and especially by perculating sulfur compound laden water. Such sulfur compounds are oxidized when the fuel is burned and the sulfur oxides generated pass into the atmosphere where they are dispersed, particularly down-wind. Upon subsequent precipitation from the atmosphere, particularly during rain and the like, such sulfur oxides are combined with atmospheric moisture to form sulfurous, sulfuric and other sulfur acids which give rise to multiple detrimental effects, including damage to biological systems, both in the air and in the water, general deterioration of the environment, progressive destruction of man-made structures and the like.

In addition to sulfur compounds which are given off by the burning of fossil fuels, high temperature combusion processes also form the so-called NOX gases, i.e. the various nitrogen oxides including NO, $NO_2$ and the like, which upon precipitation from the air with moisture in the form of rain, snow and mist also form acid solutions which have detrimental environmental effects. Since precipitation in the form of rain ultimately collects in ground water and natural bodies of water such as lakes and the like, such bodies of water tend to suffer from an increasing content of both sulfur and nitrogen acids with serious detrimental effects upon the flora and fauna of the aquatic environment. While lakes and other bodies of water are normally slowly neutralized by natural processes, particularly in limestone regions, the continued receipt of acidified precipitation into such lakes and other bodies of water frequently proceeds at a faster rate than the natural neutralization of the acid within such bodies of water. Small degrees of acidification harms aquatic organisms through the inhibition of reproduction and growth, and in more extreme cases, causes almost complete mortality. In addition, the acidification of lakes, streams and other bodies of water increases the soluble aluminum content of the water which is particularly harmful to young fish. The acidification of lakes and other bodies of water, even of a fairly small degree, can also very seriously affect the ecological balance in such bodies of water with serious environmental and economic effects.

The acidification of lakes, streams and other bodies of water, is as noted above, not a new phenomenon. However, it is an increasingly serious phenomenon. In the past, a variety of techniques have been employed to counteract or mitigate the adverse effects of excess concentrations of acid in bodies of water. For example, American farmers may use millions of tons of neutralizing agents every year to counteract the acidity produced by nitrates and sulphates in chemical fertilizers. Furthermore, since the middle of this century, governmental agencies and private groups in the United States have used a variety of neutralization techniques to protect fish production in acid lakes and other aquatic environments. The problem with acid lakes has been particularly severe in the Eastern United States and the Scandanavian Peninsula in Europe. The reason for the particular problem in both these areas is the fact that they receive prevailing winds from other industrialized areas and a considerable amount of precipitation, all of which tends to remove acid components which have entered the atmosphere in other regions from both industrial and transportation combustion processes used in such regions. Since, as indicated above, acidified waters tend to collect in lakes, unless there is a continuous neutralization of such waters, the lakes tend to become increasingly acidified, often to the point where not only native plants and fish are killed, but essentially all but very specialized organisms are very adversely affected, if not completely destroyed.

While a large proportion of the acid lake problem is due to so-called acid rain, as explained above, other industrial and agricultural practices also add to the acid lake problem. For example, nitrogen and sulfur containing fertilizers may leach into the ground water or run off into natural bodies of water resulting in detrimental acidification of such bodies and poisoning of desirable organisms. Sulfur acids may also form in coal seams which have been opened and exposed to the atmosphere as well as water from various sources and may also be formed from the iron pyrites or iron sulfur compounds in waste coal or culm piles and then leached into surface and ground waters.

One method of counteracting the acid rain and acid lake problems is by neutralization of the affected lakes and other bodies of water by various neutralizing agents. Rehabilitation of surface waters has been experimentally practiced with a number of reagents, including lye, sodium carbonate, calcitic and dolomitic limestones, hydrated lime, quicklime and slurried industrial slags, which are essentially calcitic or dolomitic lime material. Calcitic limestone has proved for a number of reasons to be the material of choice, particularly since it is readily available and relatively cheap. Calcitic limestone is comprised primarily of calcium carbonate and is a natural solution component of many lakes and streams where it acts as a buffering agent. Calcitic limestone also has a moderate reactivity which protects fish against so called pH shock. It may also be relatively easily prepared in slurries or solutions applicable to a variety of acidic conditions.

Slurries and solutions of calcitic limestone, usually in the form of a slurry, have been applied to lakes and other bodies of water by means of boats and by helicopters, usually by spraying the slurry from a hose into the body of water. Normally the pH of the body of water is first established and the volume of water in such body is at least roughly estimated or determined, after which the amount of calcium slurry necessary for application to the body of water in order to neutralize the acid content of the water is calculated. Refinements of the basic neutralizing agent application process have included division of a body of water arbitrarily into a number zones and measurement of the depth of the water in each of such zones whereupon an amount of neutralization agent may be applied to each zone calculated to effect the desired raising of the pH of the water in such zone. The pH reading, of course, is a measure of the hydrogen ion content of the water. A further refinement has been the use of coarser particles of calcitic material in a limestone slurry to penetrate deeper portions of a lake or other body of water. The larger particles resist complete dissolution in the water before they reach the bottom.

It can be readily seen from the description above that the liming or neutralization of an acid lake is no small undertaking. The neutralization agent cannot be applied heedlessly to such body of water because of the cost and since the production of too basic an environment in the water may frequently be almost as harmful to aquatic life as too acid an environment. In fact, the so-called eutrophication of lakes by excessive contents of phosphates and other growth-accelerating ingredients may be accentuated by overliming of such bodies of water. Furthermore, while limestone particles which settle to the bottom of the average lake tend to sink into the bottom mud or ooze and are thus effectively removed from further affecting the basicity of the overlying water, excessive bottom limestone is thought to adversely affect adjacent aquatic plant life.

It is also undesirable to have zones of different acidity or pH in a lake, since aquatic life traveling from one zone to another may be deleteriously affected. Fish especially, and game fish, in particular, tend to be adversely affected by so-called pH shock engendered by quick changes in the pH of their environment. Zoning and stratification of pH zones in lakes is often accentuated by the slow mixing of the waters of such lakes. Consequently, it has been found very difficult to effect a uniform and accurate liming of bodies of water by the equipment and techniques heretofore used. This has been so, in spite of the fact that very great care is taken in the liming of lakes to try to obtain a uniform application of the liming or neutralization material, i.e. the aim is to apply a uniform amount of material to a uniform volume of water. In most cases, this has been done by first drawing up a topographical map of the lake to be treated using soundings or measurements of the depth of the lake taken in many places throughout such lake. A grid is then placed over this map and the lake is divided into zones based on the average depth of such zones. From this topographical map, the volume of water in such zones is calculated. Next, the amount of material required for each zone for neutralization of the water in such zone is determined from the volume of water, the acidity measurements of the lake, and the neutralization value of the chemical which is to be applied to the lake. The neutralization material is then applied to the lake waters, usually from a boat or a helicopter in conformance with, or as much in conformance with as is possible, these predetermined calculations.

In actual practice, the treatment zones are usually marked in the lake by placing buoys at stratigic boundries thereabout, whereupon each zone can be treated with the precalculated amount of material. A slurry of neutralization agent in which the particles are of approximately the size which will dissolve completely as they settle from the surface to the bottom of the lake is then prepared. If the water, however, turns out to be deeper than expected, the particles may dissolve before they reach the bottom, leaving a bottom volume which has not been neutralized. Since bottom water in a lake very often is either not changed or infrequently changed by mixing, this unneutralized portion may persist for many weeks or even months. On the other hand, if the size of the particles of the slurry are too large for the depth of the water, such particles may not dissolve by the time they reach the bottom of the lake, but will settle onto the bottom and either be lost in the bottom debris or mud or form an over-neutralized zone along the bottom. This over-neutralized zone will also tend to persist over long periods due to non-mixing of the bottom waters.

It is an object of this invention, therefore, to provide a method of applying treatment materials such as neutralization materials to a lake or other body of water in a more accurate manner than could heretofore be accomplished.

It is a further object of the present invention, to provide a method of applying a treatment agent such as a neutralization agent to a lake or the like in accordance with a simultaneously calculated plan of application.

It is a still further object of this invention to provide an apparatus arrangement which may apply a carefully controlled and simultaneously calculated amount of treatment agent such as neutralization agent to a lake or other body of water.

It is a still further object of this invention to provide an apparatus assembly which is especially and appropriately adapted to the application of a slurry of calcitic limestone to a body of water in an accurately measured, expeditious and efficient manner by a readily portable application apparatus.

Other objects and advantages of the invention will become evident upon review of the following description and explanation of the invention in conjunction with the appended drawings.

SUMMARY OF THE INVENTION

The present invention effectively obviates many of the disadvantages of prior methods and means for the application of treatment agents such as neutralization or other chemical treatment agents to an acidified body of water such as a lake or the like. In accordance with the invention, a vessel designed to carry the neutralization agent and apply it in an accurately measured amount to the lake is equipped to measure simultaneously its own progress over the surface of the lake and the depth of the water beneath the vessel. The depth and speed of the vessel are integrated together with the width of the application path provided by the vessel to determine the volume of water being passed over by the vessel in any given period of time. This information is then, along with other information such as the pH of the water, used to control the rate at which the neutralization agent is applied to the lake water. By thus measuring the depth of the water as the vessel is guided along its predetermined distribution path, and integrating this information with the velocity of the vessel, a very accurate determination of the volume of water being passed over per unit of time can be made. The application of the chemical treatment agent such as a neutralization agent necessary to treat the column of water being passed over can then be effected by pumping an amount of treating agent from holding tanks on the vessel through a series of spaced orifices in a distribution or spray pattern network which extends from or about the vessel in a predetermined pattern over the body of water.

In a modification of the method of the invention, several treatment materials or a variation of the one treatment or neutralization material may be applied to the surface of the water, either serially or simultaneously. For example, two distribution systems may be provided on the vessel, each holding a slurry with different sized particles of neutralization agent. When the vessel passes over a particularly deep portion of the lake, the relative percentage of the larger size material will be increased and pumped into the lake to fall or settle through the lake waters completely to the bottom of such lake. When, on the other hand, the vessel passes over a shallower portion, a relatively smaller proportion of larger sized slurry particles may be pumped from the vessel's tanks or the larger sized slurry particles may be completely cut off.

While the invention is described in particular with respect to the neutralization of acid lakes and the like for which it has been found to be particularly advantageous, it will be understood that other treatment agents besides neutralization agents could be applied by means of the invention; for example, various bases other than calcitic limestone and analogous materials, acids in case a body of water is too basic, fertilizers, algaecides, bacteriacides, fungicides and herbicides as well as other materials which may require very accurately controlled application to major bodies of water can be very effectively and economically applied by the invention. In general, therefore, the invention can be used to apply various chemical treatment agents to a body of water to correct a predetermined chemical imbalance.

BRIEF DESCRIPTION OF THE DRAWINGS

FIG. 7 is a broken away deck plan view of the improved embodiment of the invention shown in FIG. 6.

DESCRIPTION OF THE PREFERRED EMBODIMENTS

The acidification of lakes and other bodies of water by the receipt into such bodies of so-called acid rain caused by sulfur and nitrogen oxides released to the atmosphere by combustion of fossil fuels and, in the case of nitrogen oxides, particularly by high temperature combustion processes, as well as by lightning and other natural processes, constitutes a serious current problem. Various neutralization processes have been used in the past to alleviate or mitigate the acidification of lakes and other bodies of water. However, all such previous methods have been complicated and time consuming due to the requirement that neutralization agents be applied carefully and accurately in order to satisfactorily neutralize the excess acidic properties of the water, and yet not make the water basic in character which could also be detrimental.

The present inventor has discovered that the application of neutralization agents to bodies of water, as well as the application of other chemical treatment agents to such bodies, can be conveniently and accurately accomplished by the use of properly designed apparatus and by a method which involves passing a vessel or other floating platform across the body of water in a predetermined pattern designed to encompass the entire surface of such body of water, while at the same time substantially continuously measuring both the speed of the vessel, or platform, across the surface of the water, plus the depth of the water below the vessel at all times. Preferably, the pH of the water across which the vessel is passing is at the same time also accurately determined. The data obtained from suitable detection devices or apparatus with regard to (a) speed of the vessel, (b) depth of the water below the vessel at any given point or time, and (c) the pH of the water through which the vessel passes is continuously integrated together in a formula to determine the amount of neutralization agent which must be applied to the body of water as the vessel or floating platform is passing across its surface. The application of the neutralization material is simultaneously varied in accordance with the volume of water, from the surface downwardly to the bottom, to which neutralization agent is being applied. A further understanding of the invention will be gained by review of the following description below together with the appended figures.

Figure 1:
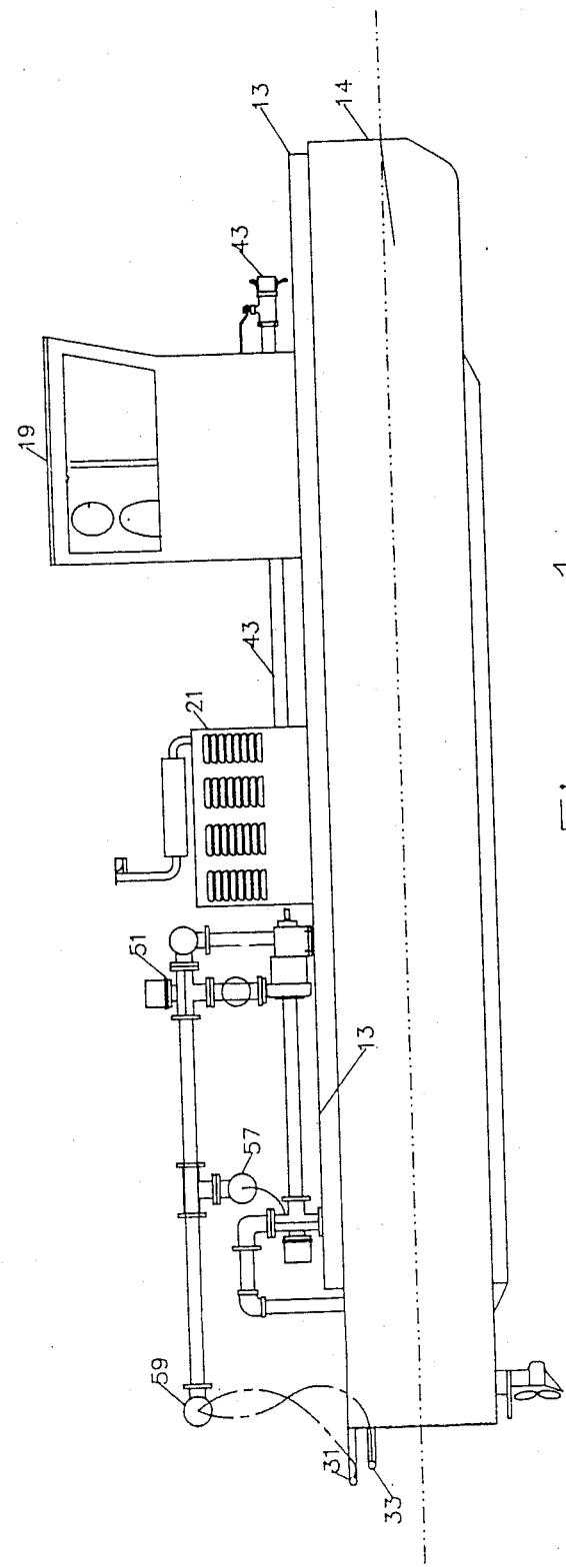
FIG. 1 is a side elevation of a vessel designed and constructed for practice of the invention.

FIG. 1 is an elevation of a preferred design of a vessel 11 adapted for application of a chemical treatment agent to a body of water. The vessel 11, comprises as shown in more detail in FIGS. 2, 3 and 4, a main tank body or hull 13 to which are extendably attached two outboard pontoons 14 and 15 which serve both to provide buoyancy to the entire vessel to counteract the weight of a supply of treatment agent contained within the main tank or hull 13, and to stabilize the hull or tank 13 and the vessel as a whole to prevent capsizing. A pilot house 19 is provided on the forward section of the main tank hull 13 and a main pump enclosure 21 is located atop the top deck of the main tank hull 13. A propulsion means or motor which, as shown, is preferably in the form of an outboard motor 25 (see FIG. 2) or the like, is secured to the rear of the main tank or hull 13. Two swinging spray arms 27 and 29 are pivotally mounted at the rear or stern of the vessel 13 in a position such that they may be swung out over the water as the vessel progresses across the surface of the lake or other body of water.

Figure 3:
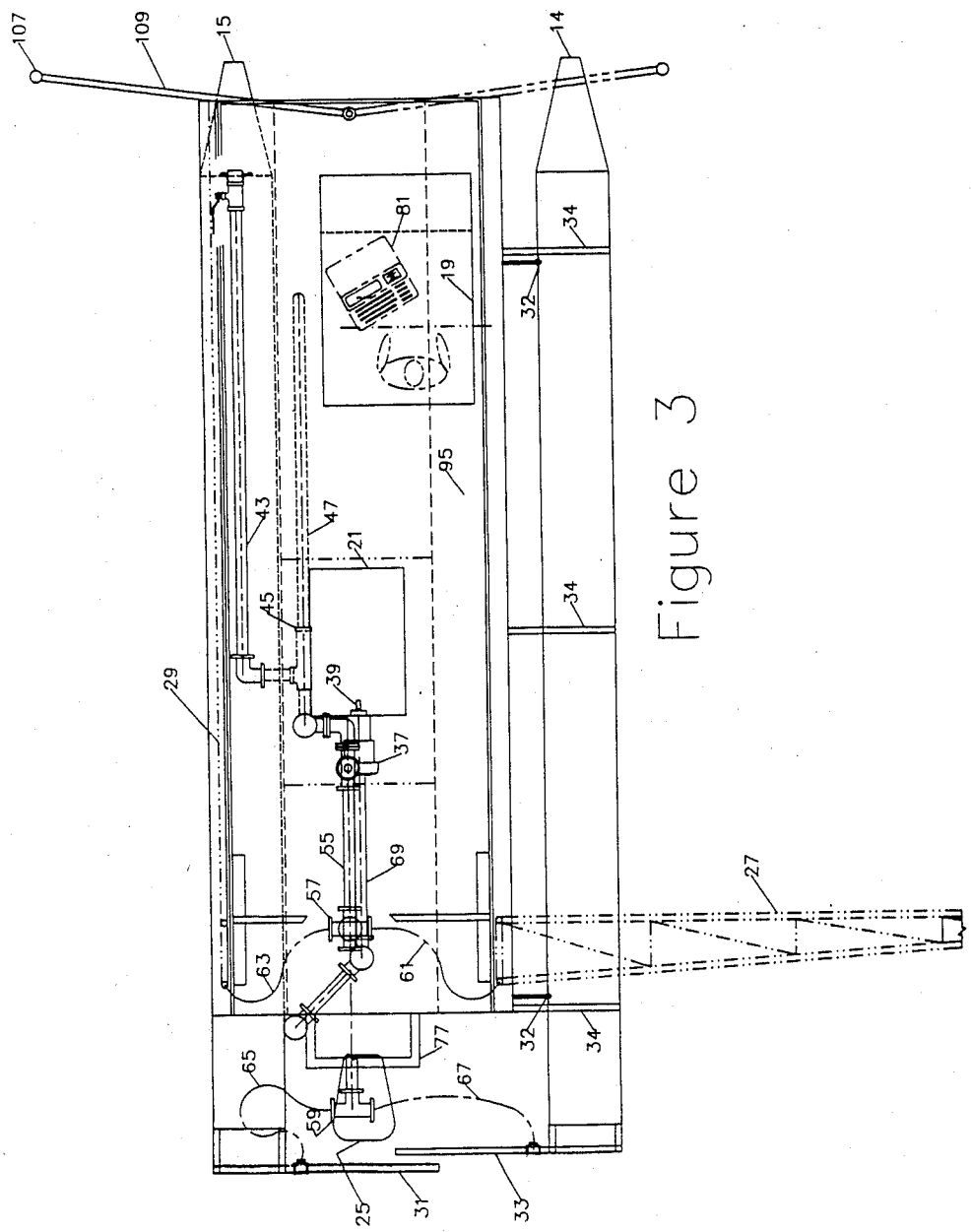
FIG. 3 is a broken away top or deck plan view of the vessel shown in FIGS. 1 and 2.

This may be best seen in FIG. 3 where the starboard spray arm is shown pivoted into its extended position over the water and the port spray arm is shown in retracted position where it lies along the deck of the vessel 11. It will be understood that each pivoting spray arm includes a hollow tubular section 27a or 29a along the longitudinal extent of which are spaced small orifices or nozzles 28 best seen in FIG. 4 through which a liquid or slurry may pass when the hollow section of the spray arm is filled with such slurry or other treatment agent.

Figure 2:
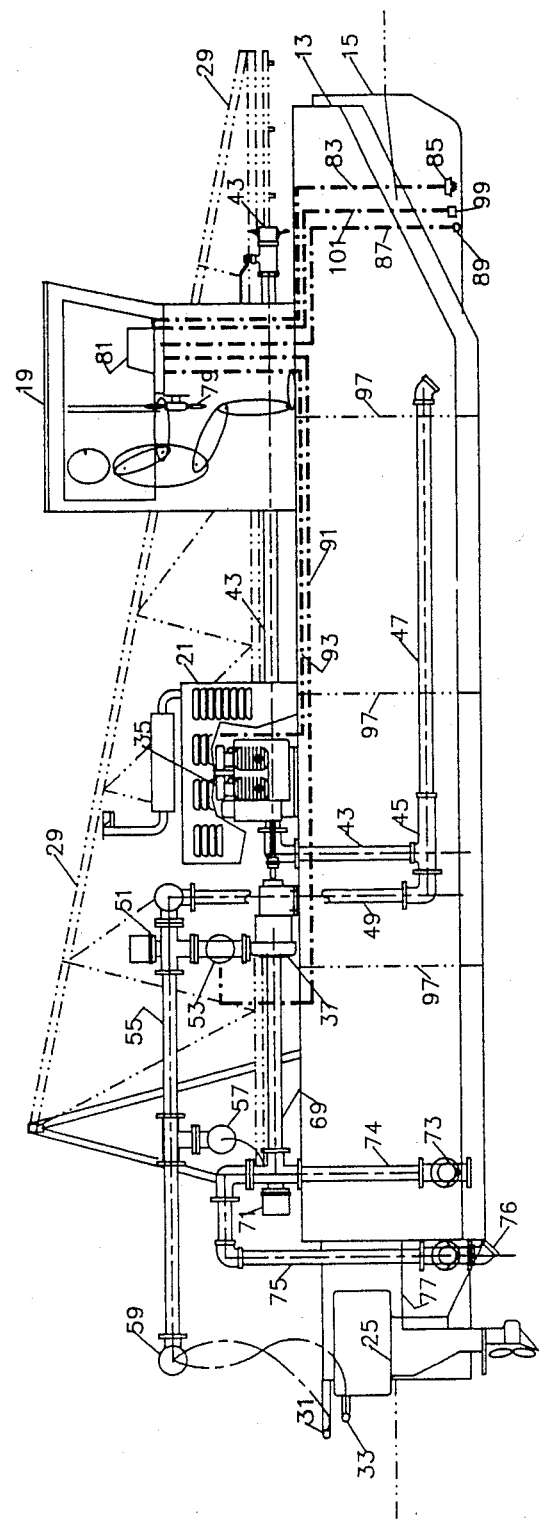
FIG. 2 is an elevation of the starboard or right side of the vessel shown in FIG. 1 partially broken away to show the internal mechanisms.

At the rear or stern of the vessel are located two spray bars 31 and 33 which are also hollow and provided with spaced orifices 30 in the manner similar to the spray arms 27 and 29. The spray bars 31 and 33 are preferably secured to the pontoons 14 and 15 in an overlapping pattern, as best seen in FIG. 3, and serve to provide spray material in the central location between the spray arms 27 and 29 so that a uniform application of the treatment agent may be made to the surface of a lake or other body of water as the vessel 11 passes forwardly across its surface. As best seen in FIG. 2, the pump enclosure 21 contains a pump motor 35 which operates a pump 37 through a shaft connection 39. The pump 37 is connected into or is an integral part of a pumping and sparging pipe assembly indicated generally as 41. The pumping and sparging pipe assembly 41 includes a bulk material fill pipe 43 which is connected to the upper portion of a venturi eductor 45. The forward or discharge portion of the eductor 45 is connected to a mixing tube 47 which opens into the forward portion of the tank hull 13. The eductor 45 is also connected at the rear or inlet to the pump 37 through connecting pipe 49 which passes through a motor operated three-way valve 51 connected to the pump 37 through a flow meter 53. A third arm of the three-way valve 51 is connected to a feed pipe 55 which extends to the rear or stern of the vessel and is provided with hose connections 57 and 59. Hose connection 57 serves to connect suitable hoses 61 and 63 to the feed pipe 55. The hoses 61 and 63 lead respectively to the spray arms 27 and 29 or more particularly the spray pipes 27a and 29a. Hose connection 59 serves to connect the feed pipe 55 through the hoses 65 and 67 respectively to the spray bars 31 and 32.

The intake side of the pump 37 is connected to an intake line 69 which is connected at the other end to a motor operated three-way valve 71. One arm of the three-way valve 71 is connected via a tank suction line 74 to a foot valve 73 within the interior of the main tank or hull of the vessel 11. The other arm of the three way valve 71 is connected with a lake suction line 75 which terminates outside the main tank or hull 13 of the vessel 11 in an intake 76.

As shown in the drawings, the outboard motor 25 may be attached to the main tank or hull 13 via motor bracket 77. In the pilot house or wheel house 19 there is provided the usual wheel 79 for navigation or steering of the vessel. Also preferably located in the wheel house or pilot house is a control computer 81 which may be a standard microcomputer suitably programmed for operation in accordance with the invention. The control computer 81 is connected via suitable leads with various external detection devices or elements for detecting the speed of the boat or vessel, the depth of the water under the vessel, and preferably also the pH or other chemical balance of the water surrounding the vessel. The control computer will also preferably be connected with the operating portions of the system such as the flow meter detector 53 and the pump motor 35. The computer may also be, but need not, be connected to the various motor operated three-way valves 51 and 71 which control the path of the material through the pumping system. In this regard detection lead 83 connects the control computer 81 to a hull speed transducer 85 located on the lower outer surface of the pontoon 15. Detection lead 87 connects the control computer 81 to ultrasonic depth transducer 89 which is also located on the lower surface of the pontoon hull 15 in a position such that ultrasonic waves may be directed toward the bottom of the lake and upon reflection therefrom detected and the time interval for return noted in order to calculate the depth of the water. Likewise, detection lead 91 extends from the control computer 81 to the flow meter 53 which detects the flow of slurry through the outlet from the pump 37. The further control lead 93 connects the pump engine 35 with the control computer 81 in order to regulate the speed of such engine and therefore the slurry volume passed through the pump 37.

The control computer 81 as noted may be a microcomputer but may also be any other type of digital or analog computer which can receive the required data and process it. Such computer must, of course, incorporate or have available an accurate clock function or other timing device in order to accurately determine the water depth from the sonic or other reflected wave data. Upon receipt the various data is preferably stored at least initially in the microcomputer memory for use in contemporaneous calculations, but can also be entered upon magnetic tape or disks for future study and analysis. The microcomputer 81 or other computer provides an essential element of the control system. Although a number of commercially available devices may be employed as the control computer 81, a relatively low power device such as model PC of the IBM Company has been found to be very satisfactory. The microcomputer controls the pump motor or other metering means for control of the dispensing of the neutralization agent in accordance with the calculations effected by the processing section of the microcomputer based upon the meter data received from the sonic pressure meter (for water depth) and the speed data received from the hull speed transducer, which may take the form of a partially shielded paddle wheel arrangement which rotates at a rate proportional to the speed of the vessel through the water. The same type of meter device is frequently used for accurate measurement of the movement of a sailing yacht through the water. As indicated previously the microcomputer may also receive electronic signals from other detection apparatus such as a pH meter electrode and provide control signals to other dispensing related mechanisms such as the various solenoid valves in the system and the like.

The vessel 11 is usually transportable on a trailer or the like to the point of use. In order to facilitate such transportation, the pontoons 14 and 15 are retractable into a position nested closely against the main tank or hull 13. This is shown more particularly in FIGS. 3 and 4 where it may be seen that the pontoon 14 is in extended position and the pontoon 15 is in the retracted position. The pontoons 14 and 15 are preferably extendable from a retracted position to an extended position and back again through the action of a hydraulic cylinder means 32 which serves to move the pontoons inwardly and outwardly upon supporting slide bars 34.

Other suitable supporting and retracting means may be used to support and move the pontoons with respect to the remainder of the vessel.

Figure 4:
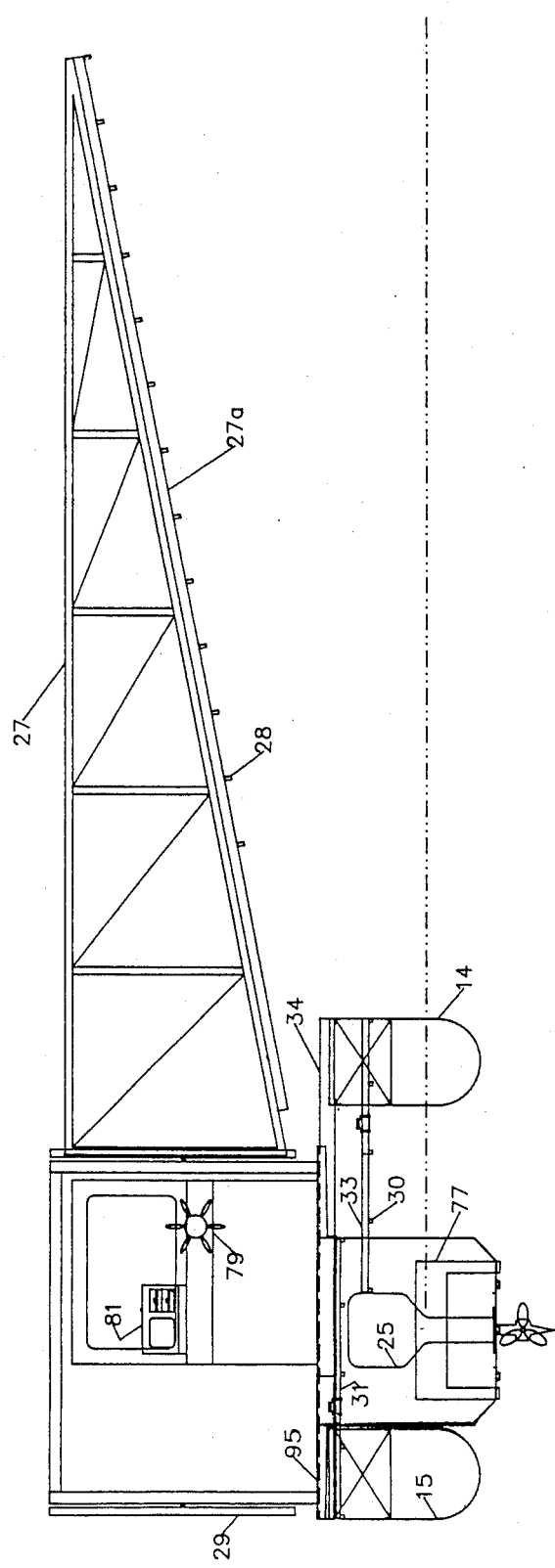
FIG. 4 is a rear or stern elevation of the vessel shown in the previous Figures.

It will be seen in FIGS. 3 and 4 also that the vessel has an extended deck 95 which projects beyond the sides of the main tank or hull 13 and in effect covers the position in which the pontoons 14 and 15 retract when the vessel is not in the water. It will also be noted that the pontoons 14 and 15 are somewhat longer than either the main tank or hull 13 or the deck 95 positioned on top of the tank 13 and extending to the sides over the position of the retracted or nested pontoons. It will also be noted in FIGS. 2 and 3 that the main tank or hull preferably has three bulkheads or tank partitions 97 which divide the main tank essentially into four separate portions or compartments. In the embodiment of the invention illustrated in FIGS. 2, 3 and 4 these bulkheads 97 have openings in them to allow the slurry material free passage from one compartment to another under normal conditions, but small enough to prevent surging or sloshing of the slurry from section to section under outside influence. As will be seen presently the bulkheads could be imperforate if it is desired to store different materials in the various compartments and to dispense such materials directly from the individual compartments.

In operation, the vessel 11 is transported by trailer or the like to the lake or other body of water where it is to apply a neutralization agent or other chemical treatment agent to the lake. Normally the vessel 11 will be transported overland without any load of neutralization agent in the main tank or hull 13 in order to reduce the weight. After the vessel 11 is launched into the lake or other body of water by running the trailer into the lake until submerged and the vessel floats therefrom or is otherwise launched and the pontoons 14 and 15 extended, the vessel is brought near the shore, preferably with its bow against a dock with sufficient water depth to allow for the change in hull displacement as the material is loaded, and a bulk material hose from a tank truck or the like is connected to the bulk material fill pipe 43. The pump engine 35 is then started and the three-way valve 71 operated so that the lake suction line 75 is connected with the pump intake line 69 and operation of the motor 35 draws water through the lake suction line 75 into the valve 71 and thence into the intake line 69. Water passes through the pump 37 and out through the flow meter 53 into the three-way valve 51 which is operated in such a manner that the fluid then passes down the connection pipe 49 into the venturi eductor 45, through the venturi eductor and out the mixing tube 47 into the forward portion of the main tank or hull 13.

As the water passes through the venturi eductor 45 it creates a suction in the bulk material fill pipe 43 so that material in such fill pipe is drawn into the venturi eductor and expelled through the mixing tube 47. This arrangement of valves is continued until the main tank hull 13 is substantially filled with lake water or filled to whatever level is desired. At this point the three-way valve 71 is operated so that the lake suction line 75 is closed and the foot valve 73 to the tank suction line 74 is opened so that lake water is now drawn from the interior of the main tank or hull 13 near the stern and passed through the three-way valve 71 to the intake line 69 into the intake side of the pump 37 and then through the flow meter 53 and the three-way valve 51 down through the connection pipe 49 and out the venturi eductor 45 and the mixing tube 47 into the forward portion of the hull as before. As the water continues to flow through the venturi eductor 45 additional bulk material is drawn through the bulk material fill pipe 43 into the system. This mode of operation is continued until the bulk material in the tank truck or the like has been completely drawn into the main tank or hull 13. Emptying of the bulk material from the truck may be aided by a separate pressure or other pumping system in the tank truck. When all the material which is desired to be included in the slurry charge has been drawn into the hull 13 the bulk material fill pipe 43 will be closed off and the pump system will continue to operate in the same mode so that the material in the tanks is continuously mixed or sparged. This may be referred to as the sparging mode of operation. The vessel is at this point ready to operate to spread the neutralization material into the lake.

The vessel 11 may then be navigated into the lake by conventional operation of the outboard motor 25 and piloting of the wheel 79 until the vessel is traveling in a straight course from one side of the lake to the other. At this point three-way valve 51 may be operated to direct the slurry being sucted or drawn in at the foot valve 73 from the interior of the main tank or hull and directed through the feed pipe 55 to the hose connections 57 and 59 from whence it passes through the respective hoses 61 and 63 and 65 and 67 and thence to the spray arms 27 and 29 and the spray bars 31 and 33. The slurry material then passes from the spray arms 27 and 29, and spray bars 31 and 33 (in the case of the spray arms, through the spray pipes 27a and 29a) and out through the spray orifices or nozzles 28 and 30 which are spaced evenly upon the spray bars and spray arms respectively so that an even pattern of spray of the essentially liquid slurry material is sprayed upon the surface of the lake. When the vessel reaches the far shore of the lake it is turned and proceeds back along a parallel path in the same mode of operation continuing to spray material onto the surface of the lake through the nozzles 28 and 30. The parallel pass of the vessel will, of course, be directed or navigated so there is a minimum of overlap of the spray being passed into the water while maintaining a contiguous pattern of spray with no untreated intermediate areas. At the same time the control computer receives data from the hull speed transducer which can be converted into speed, preferably in feet per minute and the ultrasonic depth transducer, as known to those versed in the art, projects ultrasonic pulses toward the bottom of the lake and detects the return of such pulses from the bottom after being reflected therefrom. The time lapse between the output pulse and the detection of the reflected signal is monitored and used by the computer 81 or an appropriate separate computer apparatus to determine the distance which the ultrasonic pulse has traveled and therefore the distance of the bottom of the lake from the ultrasonic depth transducer 85 positioned at the bottom of the pontoon 15.

There is preferably also a pH indicator device 99 disposed on the pontoon 15 and also preferably upon the pontoon 14 in a position such that it is exposed to the lake water as the vessel passes by. The pH electrode 99 is connected to the control computer 81 through the lead 101. Preferably, there is also a similar pH electrode mounted on the opposite pontoon 14 in the same position. This pH electrode 103 is connected to the control computer by the lead 105. Alternatively, a pH electrode 107 may be positioned on the end of a short boom 109 which is in turn pivotally mounted on the forward portion of the deck 95 on the main tank or pontoon 13 in a position such that the boom 109 may be pivoted from side to side so that the electrode 107 may be dipped into the surface of the water on the far side of the vessel 11 from which the vessel passed during a previous neutralizing agent discharge. In this manner the pH electrode 107 will not be effected by the neutralization agent which has already been applied to the surface of the lake on the opposite side of the path of the vessel 11. If the passes of the vessel are short and are closely spaced in time the boom 109 is unlikely to be necessary, particularly if the spray arms of the vessel are fairly long, for example, twenty feet or more. However, if the passes of the vessel are not closely spaced in time or the surface waters are turbulent, the boom 109 may add to the accuracy of the pH readings. The pH electrodes positioned on the two pontons may likewise be used alternately depending upon the direction of the previous neutralization track. The two pontoon mounted pH electrodes may also be activated simultaneously in which case any variation between the two is useful to indicate possible deviations caused by neutralization agent already applied to the water.

Figure 5:
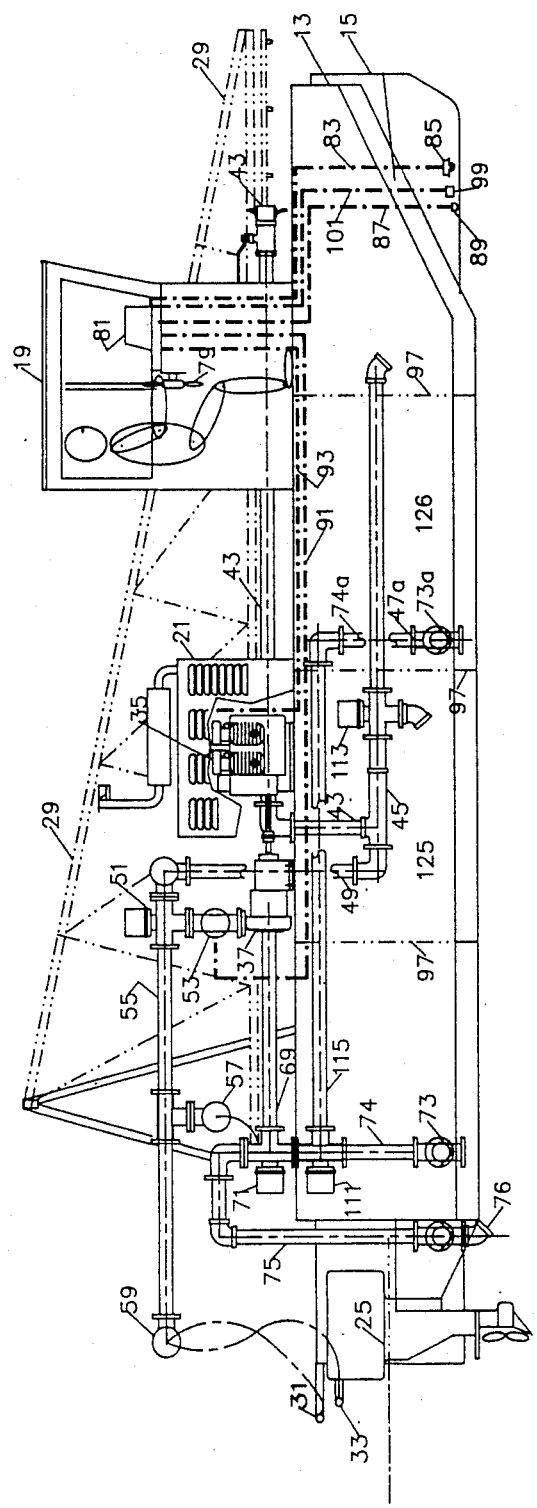
FIG. 5 is a broken away side elevation of an alternative embodiment of a vessel for practice of the invention.

FIG. 5 is a broken away view of an improved embodiment of the invention in which a piping arrangement is provided which allows material to be drawn from two separate tanks within the vessel 11 so that different treatment agents may be sprayed from the spray arms 27 and 29 and spray bars 31 and 33. The vessel shown in FIG. 5 is essentially similar to the vessel shown in FIG. 2 and the same reference numerals are used to identify corresponding parts. In addition to the parts shown in FIG. 2, however, there are two additional motor operated three-way valves 111 and 113. Three-way valve 111 is inserted in the piping between the three-way valve 71 and the foot valve 73. One arm of three-way valve 111 is connected to a transverse feed line 115 which connects with an additional tank suction foot valve 73a through piping 47a. The original foot valve 73 is arranged to draw slurried calcitic limestone or other treatment material from the rear tank or rear compartment 125 of the main tank or hull 13. The second three-way valve 113 is placed in the mixing tube 47. One arm of three-way valve 113 diverts material being mixed or sparged through eductor 45 into the rear compartments of tank 125 in hull 13. The other arm of the three-way valve 113 directs material being mixed or sparged to the forward tanks 126 of hull 13. The center bulkhead 97 in FIG. 5 is imperforate. The three-way valves 111 and 113 are preferably positioned as near the top of the tank sections as possible so as to interfere as little as possible with the contents of the tanks particularly when the tanks are relatively full of slurry material.

In operation, the apparatus shown in FIG. 5 may when the computer control detects water over a certain predetermined depth, not only increase the flow rate of the slurry as measured by the flow meter 53 by increasing the speed of the pump engine 35, but may also switch to a separate tank of slurry material which has or incorporates larger sizes of calcitic lime particles, so that such particles as they settle through the water will not become completely dissolved until they settle onto the bottom of the lake. As will be understood, the amount of slurry is adjusted so that the particles will be substantially completely dissolved just as they reach the bottom so that excess neutralization agent does not become embedded in the bottom or lie in a blanket upon the bottom, which might cause deleterious effects through excess basicity of the bottom water, not to mention being a serous waste of neutralization material and operating time, since the tanks, once emptied, must be refilled. Since the larger sized neutralization agent particles will normally be used only in deeper water and it is desirable that they should enter the flow system as quickly as possible when suitable valves are operated, it is desirable that the rear tank 125 of the main tank or hull 13 be the tank or compartment which contains the larger size slurry particles. There is then a relatively shorter feed line which must be filled with the slurry material before slurry begins to be expelled from the vessel into the water.

Figure 6:
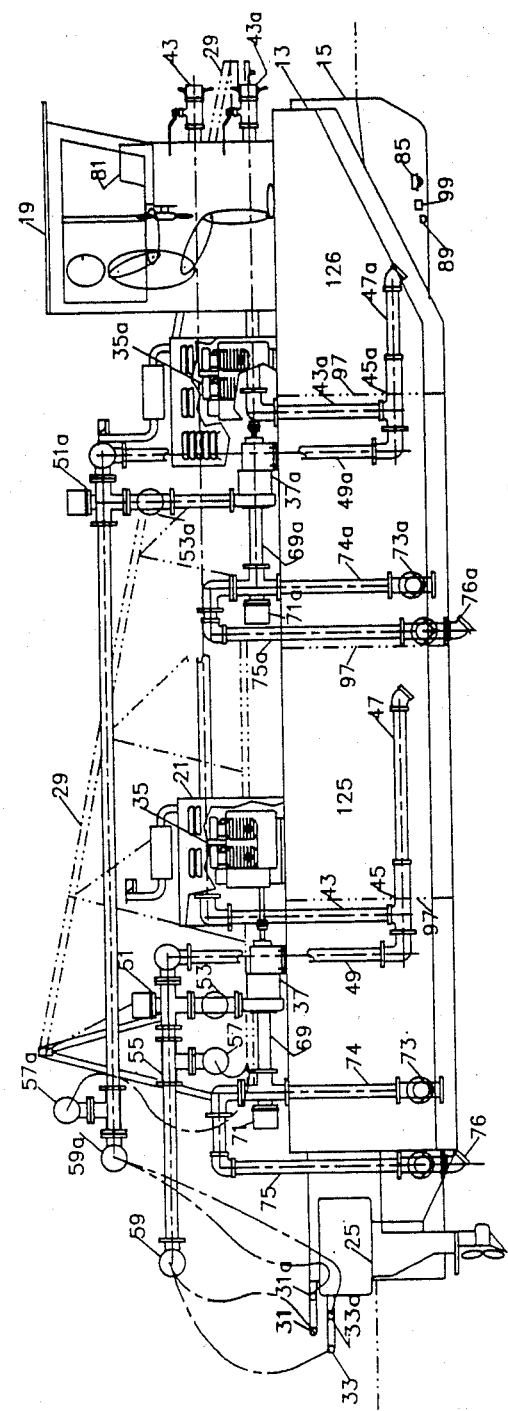
FIG. 6 is a broken away side elevation of an improved embodiment of the invention incorporating two pumping and sparging systems.

FIGS. 6 and 7 illustrate a still further improvement of the basic vessel shown in FIG. 2. FIG. 6 shows an elevation of the vessel similar to the elevations in FIGS. 2 and 5, while FIG. 7 is a plan view of the vessel. The essential difference between the embodiment shown in FIG. 5 and the embodiment shown in FIGS. 6 and 7 is the substantial duplication in embodiment of the latter figures of the pumping and sparging pipe assembly shown in FIG. 2. For convenience, therefor, the duplicate apparatus as shown in FIGS. 6 and 7 are designated by the same reference numerals as used in FIG. 5, but with a letter designation "a" used after each such reference numeral. Thus, there is a duplication of the pump 37 and shaft drive 39 to the pump designated respectively as pump 37a and shaft 39a, which pump and shaft are positioned to be driven by a separate pump motor 35a. The outlet from the pump 37a passes through a separate flow meter 53a to a motor operated three-way valve 51a which is connected to a separate feed pipe 55a which as best shown in FIG. 7, leads astern to a hose connection 59a which is connected by suitable hoses 63a and 65a to separate spray pipes 27b and 29b supported upon the spray arms 27 and 29. As best shown in FIG. 6, the tank suction line 74 and foot valve 73 are duplicated by tank suction line 74a and foot valve 73a positioned in FIG. 6 in the center of the vessel 11. A duplicate mixing tube 47a leads from the motor operated three-way valve 51a to the bottom of forward tank 126 as in FIG. 6. The venturi eductor 45a is provided along with a bulk material fill pipe 43a which may be used to feed a slurry of neutralization agent having larger sized slurry particles than are fed on board through the opposite fill feed pipe 43.

Since in the improved embodiment shown in FIGS. 6 and 7, slurry can be equally well drawn from either of the separate tanks 125 or 126 in the main tank hull 13, it does not matter to any great degree in which tank the larger size slurry particle material is contained. In other words, each pumping system on board will be used to handle separately a separate treatment agent which could not only be agents having a different particle size, but could be agents having a completely different chemical composition. The various three-way valves 71 and 71a, will be suitably operated at appropriate times to draw the necessary materials from the appropriate vessel tank. Likewise, the motor operated three-way valves 51 and 51a will be appropriately operated to direct neutralization slurry material to the hose connections 57 and 59 and 57a and 59a at appropriate times depending upon the depth of the water detected by the control computer 81 based upon signals from the ultrasonic depth transducer 89.

The apparatus shown in FIGS. 6 and 7 is particularly desirable where alternate deep water portions and shallow water portions as well as intermediate depths of water are encountered in the same large body of water, since the two application or neutralization systems can be operated completely independently. In other words, either one of the pumping systems 41 or 41a can be operated in the spray mode with the other system in the sparging mode or in intermediate depths of water the two pumping and sparging systems can be operated in the pumping mode at the same time through the separate spray pipes 27a and 27b on the spray arms 27 and 29, with the amount of slurry material expelled to either of the spray arms being regulated in relation to each other so the exactly desired neutralization of the water can be attained. It is also possible to operate both systems in deep waters where the heavier material or particles will fall directly to the lower portions of the water while the shallower portions will be neutralized mainly by the smaller sized particles which will completely dissolve before they reach the lower or bottom portion of the lake.

The same systems can be very easily used for the accurate liming of lakes where a thermocline, i.e. a sharp temperature change or inversion, exists at any given depth in the water. For example, in a lake where a thermocline exists at a 30 foot depth, it may be desirable to apply a product made up of 40 mesh by 0 particles to the areas below 30 feet deep and 325 mesh by 0 particles to all waters less than 30 feet deep. When using the prior zone method of application varying quantities of the 325 mesh and the 40 mesh slurries will be applied to the various zones, according to the average depths. However, unfortunately, some of the areas under the thermocline will go untreated as no 40 mesh slurries are applied to the shallower zones even though they would probably contain some deep water. By the use of the apparatus of the invention shown particularly in FIGS. 6 and 7 where two tanks and pumps are used, one tank and pump can handle the 325 mesh slurry and the second tank and pump can handle the 40 mesh slurry. The process controller and the control computer would be set to apply a uniformly increasing amount of slurry up to 30 feet in depth. Beyond that depth the 325 mesh slurry application would remain constant and the process controller or control computer would begin the application with 40 mesh slurry which would be adjusted according to the depth to apply a uniformly increasing amount of slurry only when the water is more than 30 feet deep. The same procedure may be followed when a thermocline is involved. Thus, the thermocline would be penetrated by the larger, heavier neutralizer particles and the water beneath it would be properly treated with the heavier material.

When using the duplicate pumping system shown in FIGS. 6 and 7 simultanouely with varying or changing amounts of slurry material being discharged it is necessary to provide a means of separately varying the discharge or pumping rate. With only one pump as shown in FIG. 2 the pumping rate can be easily adjusted by varying the speed of the pump motor 35. With two separate pumping systems two separate motors can be used as shown in FIGS. 6 and 7. Alternatively, two separate transmissions driven by a single motor can be used to vary the pumping rates of the two pumping systems. A still further alternative would be to use a variable opening valve on the discharge side of the pumps to restrict the flow when necesary. While effective, such use of a restrictive valve may place a serious strain on the pump leading to premature failure and possible settling out of the slurry particles with resultant blockage or stoppage of the pumping system.

The same dual agent treatment can be accomplished with the embodiment of the invention shown in FIGS. 2 to 4 rather than the embodiment of FIGS. 6 and 7 by first making a single traverse of the lake with the smaller mesh size slurry and then retraversing the lake with a larger mesh size slurry. In such case very accurate distribution of the smaller size slurry is made based on the depth of the water to a certain predetermined depth and upon the second traverse or series of passes across the lake the deeper portions are additionally treated. Some adjustment in the amount of slurry discharged on the first pass would in such case be made to allow for partial dissolution of the subsequently applied lime particles from the second pass while settling through the water above the thermocline. Of course, it is more convenient and also likely to be more accurate to use the improved embodiment shown in FIGS. 6 and 7 which requires only a single traverse of the lake. It will be understood that it may also be necessary to use two control computers when the two systems are used. However, most control computers are adequate to keep track of two application traverses at one time. An adequate software program may easily be provided by those skilled in the art to run both pumping apparatus from the same computer simultaneously.

Calculation of the amount of slurry to be applied can be done as follows:

Calculation:

(Water Depth)×(Application Width)×(Velocity of Vessel)
 = Cubic Units of Water being passed over by Vessel per Unit of time.

Example:

Water Depth = 40 feet
Application Width = 60 feet
Velocity of Vessel = 880 feet/minute The current volume of water being passed over
 = (40 feet)×(60 feet)×(880 feet/minute)
 = 2,112,000 cubic feet per minute.

The above information can then be used to determine the rate of chemical application that is necessary to treat the column of water being passed over each minute based upon the desired application rate of the neutralization agent as follows:

Calculation:

(Desired Material Application per Unit Volume of Water)×(Volume of Water being passed over by Vessel per Unit Time)
=Application Rate of Material per Unit of Time Example:

Desired Material Application per Cubic Foot of Water is 0.000081 gallons/cu. ft.

The vessel is passing over water at the rate of 2,112,000 cu. ft./minute.

The Application Rate of Material at that rate
=0.000081 gallons/cu. ft.×2,112,000 cu. ft./minute
=171.1 gallons of slurry to be pumped from the vessel through the orifices per minute.

The above information can be used to control the material pumping rate or other suitable application procedure so that materials are being applied at the proper rate at any given time during the vessel's distribution path across the surface of the body of water.

As indicated above, the technique of the invention can also be used to apply more than one material at a time. The same calculations would be used for each material. For example, in liming acid lakes in hot weather, sometimes two grades of limestone slurry are desirably applied, the coarser grade being to penetrate a thermocline which forms during warm weather. Otherwise small particles of calcitic limestone will tend to be retained upon the surface of the thermocline forming a high concentration of limestone and very basic conditions at an intermediate depth in the lake, but allowing no neutralization to speak of at lower depths. The use of larger particles of limestone in the slurry, however, allows the particles to penetrate the thermocline and continue sinking toward the bottom as they dissolves.

While the invention has been described and illustrated in the drawings with reference to the application or dispensation of a slurry to the surface of a lake or other body of water, it will be understood that a slurry, solution, powder or other physical form of treatment agent may be dispensed with suitable equipment to the body of water either above or below the surface.

As used herein the following terms have the listed meanings:

(a) computer means refers to any type of computer or control means or combinations of control means and/or computer which can effectively maintain a continuing control of the application or dispensing of a treatment agent to a body of water based upon contemporaneously obtained and processed data, (b) "substantially continuously" when used in connection with the detection and processing of data by a computer means refers to the collection of data on a regular basis at closely spaced intervals as well as continuously and includes serial as well as simultaneous processing at a rate sufficient to maintain substantially continuous control of the application of treatment agents using contemporaneously obtained data, (c) spray means refers not only to conventional spray means such as shown in the appended drawings but also to any type of dispensing means for continuous or substantially continuous application of a treatment agent or agents to a body of water and includes application of the treatment agent in any substantially continuous form such as a slurry, solution or powder not only to the surface of the water, but dispensing under the surface as well, (d) a floating means or floating spray transport or platform means as used herein refers to any ship, vessel, boat, catamaran, pontoon or other type of buoyant support which can effectively carry materials to be dispensed and be driven or accurately directed or sailed across the surface of or below the surface of a body of water on a uniform coarse while discharging or dispensing such materials.

(e) sparging means the continuous or periodic recirculation by pumping of a slurry type material in order to prevent the slurry particles from settling out of or otherwise dissociating from the liquid carrier medium and/or to maintain the material in a reasonably well mixed condition.

(f) predetermined chemical imbalance means any undesirable deviation from the normal chemical balance of water in a lake or other body of water where such imbalance may be rectified or treated by means of a chemical treatment agent applied to such body of water after such imbalance is discovered or determined.

While the present invention has been described at some length and with some particularity with regard to several embodiments, it is not intended that the invention be limited to any such particulars or embodiments, but it is to be construed broadly with reference to the appended claims so as to provide the broadest possible interpretation of such claims in view of the prior art and thereby to effectively encompass the intended scope of the invention.

I claim:

1. A method of comprising: providing precise chemical treatment of a body of water having a predetermined chemical imbalance, by,
   (a) directing a floating means incorporating transversely extended spray means across the surface of a body of water,
   (b) determining the velocity of movement of such floating means,
   (c) substantially continuously determining the depth of water under the floating means by on-board depth detection means,
   (d) substantially continuously processing the velocity and depth data to determine the volume of water over which the spray means passes,
   (e) adjusting the spray means to spray a predetermined amount of at least one chemical treatment agent onto the surface of said body of water proportionally related to the volume of water over which the spray means passes to correct said imbalance.

2. A method in accordance with claim 1 wherein the chemical treatment agent is applied in the form of at least two different treatment agents having different physical properties provided in at least two different batches and additionally comprising:
   (f) switching on the application of the respective treatment agents when the treatment requirements indicate a need for the respective treatment agents.

3. A method in accordance with claim 2 wherein the chemical treatment agent is applied as a slurry and at least two agents containing different sized particles are provided in at least two different batches and additionally comprising:
   (g) switching on the application of the larger particle sized material when the depth detected is greater than a selected minimum.

4. A method in accordance with claim 1 additionally comprising:
   (f) detecting a thermocline under the floating means by appropriate detection apparatus and adjusting the chemical treatment with regard to the volume of water above and below said thermocline.

5. A method in accordance with claim 4 wherein the chemical treatment is applied as a slurry and different sized slurry particles are supplied from separate source containers based upon the volume of water above and below said thermocline.

6. Apparatus comprising: means for providing precise chemical treatment to a body of water having a predetermined chemical imbalance, including,
   (a) a directable floating means adapted for flotation in said body of water,
   (b) spray means mounted upon said floating means for dispensing a chemical treatment agent into said body of water, (c) means to propel said floating means over said water,
(d) means to determine:
  (i) the velocity of said floating means across the body of water,
  (ii) the depth of said body of water under said floating body,
(e) means to control discharge of chemical agent from said spray means proportionally related to:
  (i) the velocity of said floating means, and
  (ii) the depth of said body of water under the floating means for correcting said imbalance.

7. Apparatus in accordance with claim 6 wherein the means to control discharge of chemical agent from the spray additionally takes into account:
  (iii) the pH of the water.

8. An apparatus in accordance with claim 7 wherein means are provided to control the chemical discharge in accordance with a determination of the volume of water below the spray means based upon the dimensions of the spray means transversely of said floating means and data respecting speed of said floating means provided by a movement detector and depth of the water under the spray means provided by a depth detector.

9. Apparatus in accordance with claim 8 wherein a means to detect pH of the water across which the floating means progresses is positionable upon the floating means so as to be remotely positioned relative to a previous application of treatment agent.

10. A method comprising: providing precise chemical treatment of a body of water having a predetermined chemical imbalance, by,
  (a) directing a floating means having a chemical treatment agent dispensing means having a predetermined transverse dispensing dimension across the surface of a body of water,
  (b) determining the velocity of movement of such floating means,
  (c) substantially continuously determining the depth of water under the floating means by on-board depth detection means,
  (d) substantially continuously integrating such velocity and depth data to determine the volume of water over which the dispensing means passes,
  (e) adjusting the dispensing means to introduce a predetermined amount of at least one chemical treatment agent into the body of water proportionally related to the volume of water over which the spray means passes to correct said imbalance.

11. A method in accordance with claim 10 wherein the dispensing means applies the chemical treatment agent to the surface of the water.

12. A method in accordance with claim 11 wherein the treatment agent is applied in an at least semi-liquid form.

13. A method in accordance with claim 12 wherein the treatment agent is applied in the form of a slurry.

14. A method in accordance with claim 10 wherein at least two separate treatment agents are applied to the body of water.

15. A method in accordance with claim 14 in which the two separate treatment agents are sprayed on the water in slurry form and one slurry has larger particle contained therein and additionally comprising:
  (f) switching on the application of the larger particle sized slurry when the depth of water detected is greater than a predetermined minimum.

16. A method comprising: providing precise chemical treatment of a body of water having a predetermined chemical imbalance, by,
  (a) moving a floating means with a chemical treatment dispensing means across the surface of a body of water while simultaneously continuously determining the forward velocity of such movement by on-board velocity detection means,
  (b) substantially continuously determining the depth of water under the floating means by on-board depth detection means,
  (c) continuously adjusting the dispensing means to introduce a predetermined amount of at least one chemical treatment agent into the body of water directly related to the velocity of movement of said floating means and the depth of water under the floating means at any given moment to correct said imbalance.

17. A method according to claim 16 wherein the treatment agent is applied in a transversely extended pattern with respect to movement of the floating means.

18. A method according to claim 17 additionally comprising:
  (d) continuously detecting the pH of the water by pH detection means carried by the floating means and additionally adjusting the dispensing means to take into account the pH detected.

19. A method according to claim 17 wherein the chemical treatment agent introduced into the body of water is a neutralization agent.

20. A method according to claim 19 wherein the chemical treatment agent introduced into the body of water is in the form of a lime slurry.

21. A method according to claim 20 wherein the chemical treatment agent introduced into the body of water is in the form of a calcitic limestone slurry.

22. A method according to claim 20 wherein the chemical treatment agent introduced into the body of water is introduced as two separate limestone slurries, one of which has larger average slurry particles than the other, and
  (a) dispensing the larger particle size slurry into the body of water when the depth of the water detected is greater than a predetermined minimum.

* * * * *